US007380451B2

(12) United States Patent
Kawasaki et al.

(10) Patent No.: US 7,380,451 B2
(45) Date of Patent: Jun. 3, 2008

(54) SHEET INFORMATION OUTPUT APPARATUS, SHEET PROCESSING APPARATUS AND IMAGE FORMING APPARATUS

(75) Inventors: Takehiko Kawasaki, Atsugi (JP); Norio Kaneko, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 11/463,966

(22) Filed: Aug. 11, 2006

(65) Prior Publication Data

US 2007/0036567 A1 Feb. 15, 2007

(30) Foreign Application Priority Data

Aug. 15, 2005 (JP) ............................ 2005-235178

(51) Int. Cl.
*G01L 5/04* (2006.01)
*G01N 21/00* (2006.01)

(52) U.S. Cl. ..................................... 73/159; 356/238.1

(58) Field of Classification Search .................. 73/159, 73/160, 788, 789; 356/238.1–238.3
See application file for complete search history.

(56) References Cited

U.S. PATENT DOCUMENTS 4,864,851 A * 9/1989 Houghton .................... 73/159
4,866,984 A * 9/1989 Houghton .................... 73/159
4,936,140 A * 6/1990 Houghton et al. ............ 73/159
4,936,141 A * 6/1990 Anderson et al. ............. 73/159
4,970,895 A * 11/1990 Houghton et al. ............ 73/159
5,101,661 A * 4/1992 Cresson et al. ............... 73/159
5,111,688 A * 5/1992 Houghton et al. ............ 73/159
5,138,878 A * 8/1992 Cresson et al. ............... 73/159
5,678,447 A * 10/1997 Graff ........................... 73/159
7,096,743 B2 * 8/2006 Vogel et al. .................. 73/849
7,152,861 B2 12/2006 Kawasaki ................... 271/262
2003/0053090 A1 3/2003 Nojiri et al. ................. 358/1.9
2006/0016996 A1 1/2006 Kaneko et al. .......... 250/339.1
2006/0022400 A1 2/2006 Kawasaki et al. .......... 271/227
2006/0054842 A1 3/2006 Kawasaki et al. ..... 250/559.04
2006/0275045 A1 12/2006 Kawasaki et al. ............ 399/45
2007/0023996 A1 2/2007 Kawasaki .................. 271/262

FOREIGN PATENT DOCUMENTS

JP 5-95447 4/1993
JP 2004-26486 1/2004
JP 3673777 4/2005
JP 2005-349774 12/2005

* cited by examiner

*Primary Examiner*—Edward Lefkowitz
*Assistant Examiner*—Jermaine Jenkins
(74) *Attorney, Agent, or Firm*—Fitzpatrick, Cella, Harper & Scinto

(57) ABSTRACT

A sheet information output apparatus comprising an application member for applying external force to a sheet, a receiving member in opposition to the application member for receiving the external force, and an output unit for outputting a signal corresponding to the application of the external force. The receiving member has a depressed portion having a support portion for aerially supporting the sheet, a slope face provided inside the support portion and a bottom face. The smallest length of the supported sheet W, a depth from the support portion to the bottom face d, and a length of the application member in a direction of the smallest length at height d when the application member is brought into contact with the bottom face s satisfy [(W−s)/2>5d].

12 Claims, 7 Drawing Sheets

SHEET INFORMATION OUTPUT APPARATUS, SHEET PROCESSING APPARATUS AND IMAGE FORMING APPARATUS

BACKGROUND OF THE INVENTION

1. Field of the Invention

The present invention relates to a sheet information output apparatus for gaining information as to a sheet material such as a paper sheet or a resin sheet by applying external force to the sheet material to detect a pressing force (impact force) through the sheet material. The present invention also relates to a sheet information output apparatus, a sheet processing apparatus and an image forming apparatus for conducting the prescribed output processing on the basis of gained information.

2. Description of the Related Art

In recent years, research and development on sheet processing apparatus and image forming apparatus for automatically distinguishing the kind of a sheet to be processed to adjust processing conditions have been progressed. Attending on this progress, there have been proposed sheet information output apparatus for gaining information as to a sheet material such as a paper sheet or a resin sheet by applying external force to the sheet material to detect a pressing force (impact force) through the sheet material.

Japanese Patent Application Laid-Open No. H05-095447 discloses a sheet information output apparatus for metering a deflection quantity of a sheet material to distinguish the deflection stiffness thereof. In this apparatus, the sheet material is conveyed while both edges of the sheet material are held by conveying rollers and passed through a displacement gauge as it is, so as to detect the stiffness.

Japanese Patent Application Laid-Open No. 2004-026486 discloses a sheet information output apparatus for gaining physical information as to a sheet material such as a paper sheet or a resin sheet by applying external force (percussion) to the sheet material to detect a pressing force (impact force) through the sheet material. In this apparatus, an application member is arranged in opposition to a receiving member in which a shallow depression has been formed, and the application member caused to strike on the surface of the sheet material supported over the shallow depression. When the application member is impacted on the sheet material aerially supported by the edge of the depression, the sheet material is deflection-deformed and then received by the bottom face of the depression and compression-deformed. A piezoelectric sensor for detecting impact force is arranged in the receiving member, and physical information as to the sheet material is distinguished on the basis of output from the piezoelectric sensor.

In the sheet information output apparatus disclosed in Japanese Patent Application Laid-Open No. H05-095447, a displacement quantity of the sheet itself due to curling or deformation is added as an error, and waving or fluttering of the sheet during its conveyance becomes an error, so that a deflection quantity based on the stiffness of the sheet cannot be successfully separated, and so an error in distinguishing of the stiffness of the sheet becomes great.

In the sheet information output apparatus disclosed in Japanese Patent Application Laid-Open No. 2004-026486, excessive bending is given to a sheet depending on the combination of the forms and sizes in the grooved portion and the application member to increase an error in the detection of resistance force of deflective deformation, so that there is a possibility that an error in distinguishing of the stiffness of the sheet may become great. In addition, excessive shearing force or frictional force is caused to act on the sheet according to the form of the grooved portion, so that there is a possibility that the sheet may be damaged, which is, for example, locally deforming the sheet, leaving scratch on the surface thereof or creasing the sheet.

It is an object of the present invention to provide a sheet information output apparatus, by which a detection error of sheet information becomes little, little burden is imposed on a sheet to hardly damage the sheet.

Another object of the present invention is to provide a sheet information output apparatus, by which detection accuracy is not lowered even when a receiving member is changed with time by abrasion or the like.

SUMMARY OF THE INVENTION

The sheet information output apparatus according to the present invention comprises an application member for applying external force to a sheet, a receiving member arranged in opposition to the application member for receiving the external force through the sheet and an output unit installed in the application member or the receiving member for outputting a signal corresponding to the sheet. The receiving member has a depressed portion at a position to which the external force is applied, the depressed portion has a support portion for aerially supporting the sheet situated at the application position by bilaterally holding the sheet, and a bottom face receded from the support portion, and assuming that the smallest length of the sheet bilaterally held by the support portion is W, the depth from the support portion to the bottom face is d, and the length of the application member in the direction of the smallest length of the height d from the bottom face when the application member is brought into contact with the bottom face of the depressed portion is s, said W, s and d satisfy the relationship of $[(W-s)/2>5d]$. The smallest length W of the sheet bilaterally held by the support portion is the smallest length among lengths between opposing support ends of the support portion bilaterally holding the sheet, which lengths directionally vary depending on the shape of the depressed portion. And the length s of the application member in the direction of the smallest length is the span of the application member in the direction of the smallest length.

Further features of the present invention will become apparent from the following description of exemplary embodiments with reference to the attached drawings.

DESCRIPTION OF THE EMBODIMENTS

Figure 1:
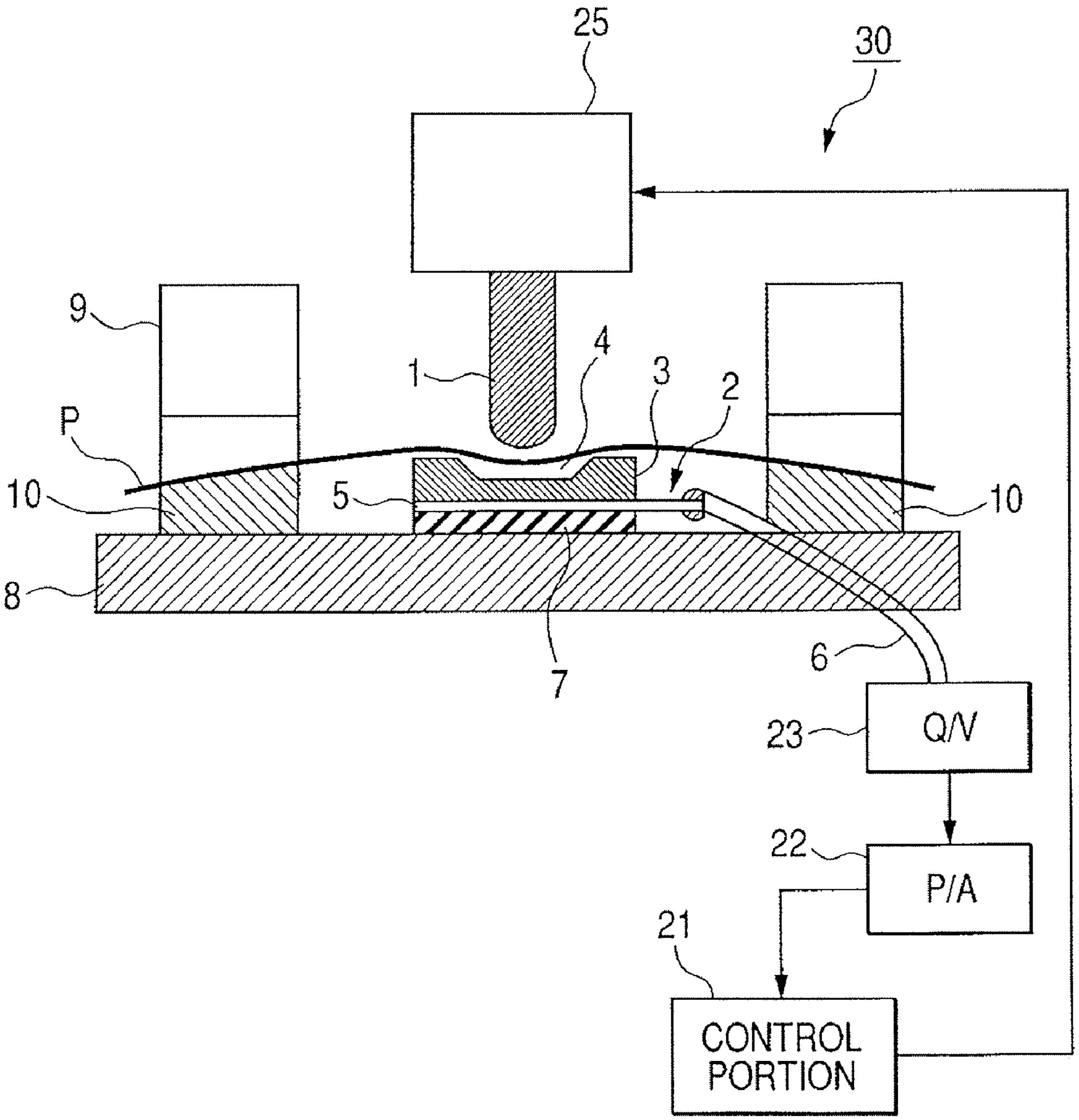
FIG. 1 illustrates the construction of a sheet information output apparatus according to an embodiment of the present invention.

A sheet information output apparatus 30 according to an embodiment of the present invention will hereinafter be described. The sheet information output apparatus 30 is installed in an image forming apparatus of an electrostatic photographic system and serves to detect the stiffness of a sheet on which an image will be formed. However, the present invention may be performed as an independent measuring apparatus for detecting physical information of a sheet or detecting the kind of a material of the sheet. The apparatus according to the present invention may be installed in image forming apparatus of other image forming systems, for example, ink-jet printers, stencil printing machines and the like, and may be installed in sheet processing apparatus, various kinds of business machines, and the like.

Limited constructional members, electronic circuits, and the like described in this embodiment and combinations thereof are mere examples of permissible selection, and it is obtained that the present invention can be performed by combining a part or all of constructional members substitutive for these members.

A sheet in the following description means any thin plate-like material irrespective of the form to be fed, such as that cut into a prescribed size or that wound into a roll. The sheet may be composed of one layer or two or more layers stacked or laminated on each other. In particular, the object for which a great effect is brought about by applying this embodiment is a recording medium (for example, plain paper, glossy paper, coated paper, regenerated paper, OHP or the like) or a manuscript. The information as to the sheet means the kind of the sheet, density of the sheet, thickness of the sheet, irregularities of the sheet, change in the condition of the sheet, printed conditions, double feed of the sheet, remaining number of sheets and the like, and is not limited to the stiffness. The change in the condition of the sheet means change caused by absorption of water or drying, or elastic deformation and plastic deformation (elongation, bending, collapse, breakage, folding, etc.) caused by dynamic force. In addition, the information includes all information required of the sheet processing apparatus, such as change in physical properties caused by tension or compressive force applied onto the sheet, vibration, lack of components of the sheet, such as fiber and coating material, adhesion of foreign matter to the sheet, an applied state of an ink, toner, coating material or the like, etc.

In this embodiment, twice percussions by the application member 1 are received twice by the receiving member 3 to detect two impacts. However, this number of striking runs is only typically shown. In an actual apparatus, the application member 1 may be caused to strike only once as shown in Japanese Patent Application Laid-Open No. 2004-026486, or at least three percussions and recoils may be conducted repeatedly to detect at least one impact on the side of the receiving member 3.

In this embodiment, a case where the application member 1 is caused to strike into a depressed portion 4 to detect stress on the side of the receiving member 3 is described. However, either one of the receiving member 3 in which the depressed portion 4 has been formed and the application member 1 may be impacted on the sheet P to detect stress on the side of the other.

<Sheet Information Output Apparatus>

Figure 2:
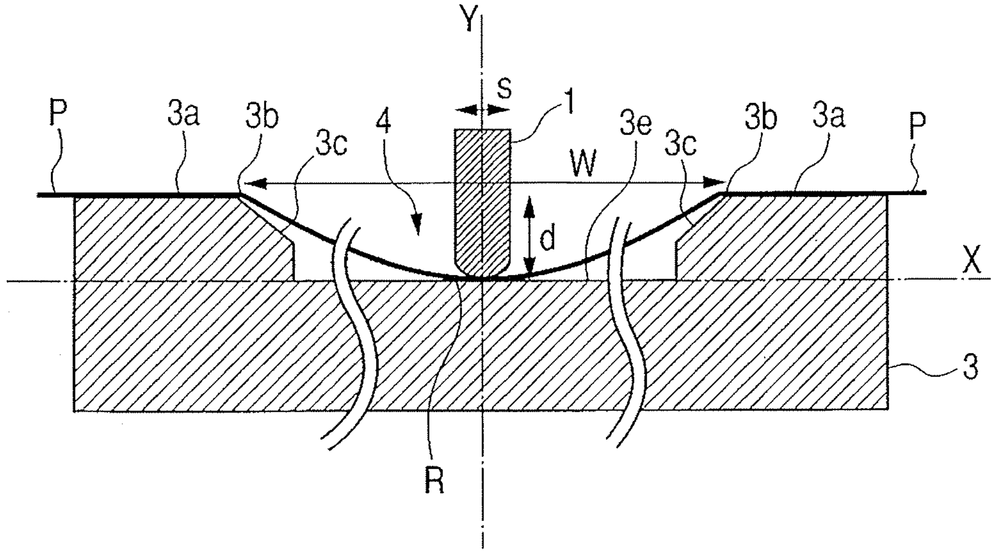
FIG. 2 illustrates the forms of a receiving member and an application member.
Figure 3:
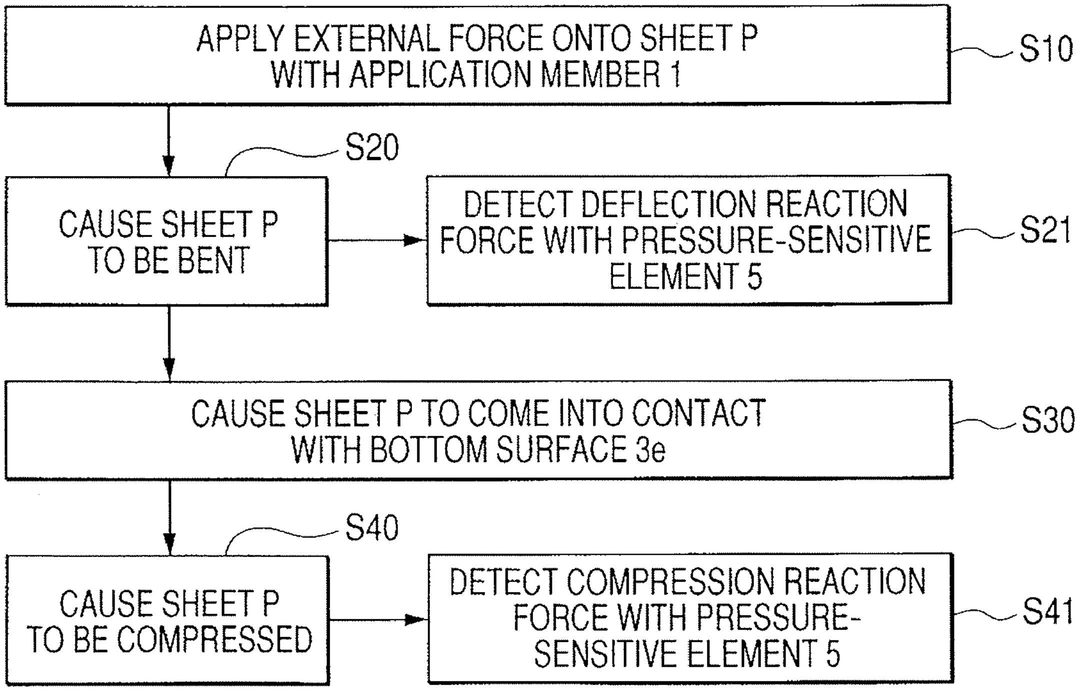
FIG. 3 is a flow chart illustrating detection of sheet information.
Figure 4A:
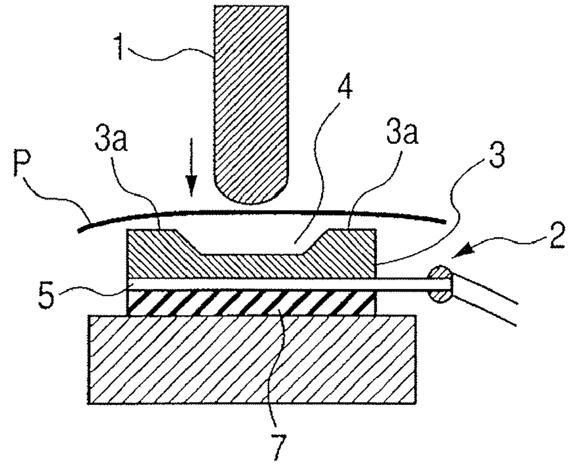
FIGS. 4A, 4B, and 4C illustrate the process of detection of impact through a sheet.
Figure 4B:
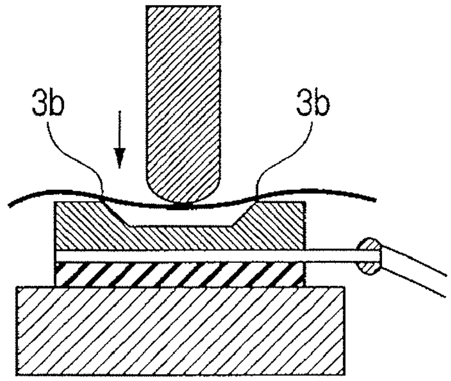
Figure 4C:
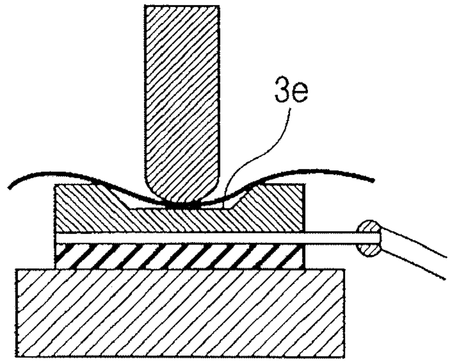
Figure 5A:
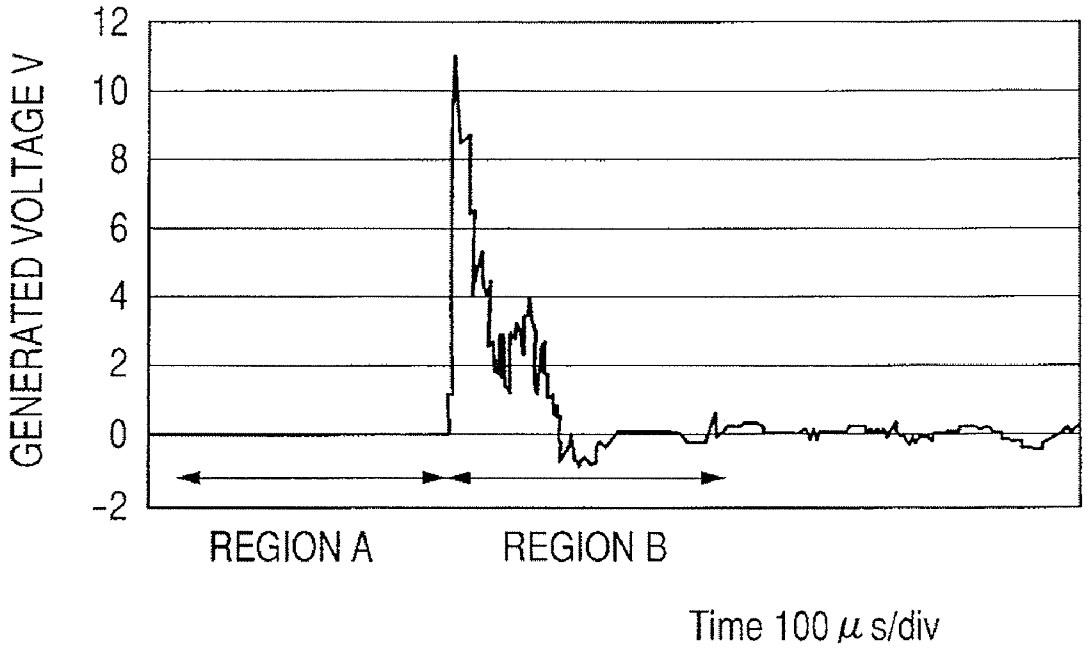
FIGS. 5A and 5B illustrate output waveforms of the sheet information output apparatus.
Figure 5B:
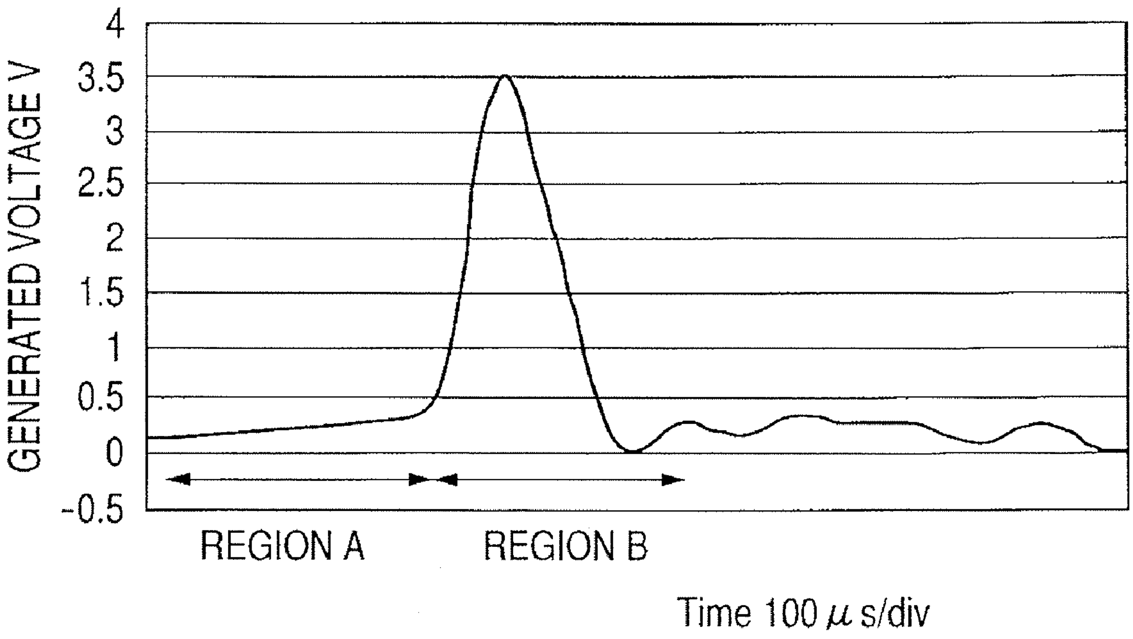
Figure 6:
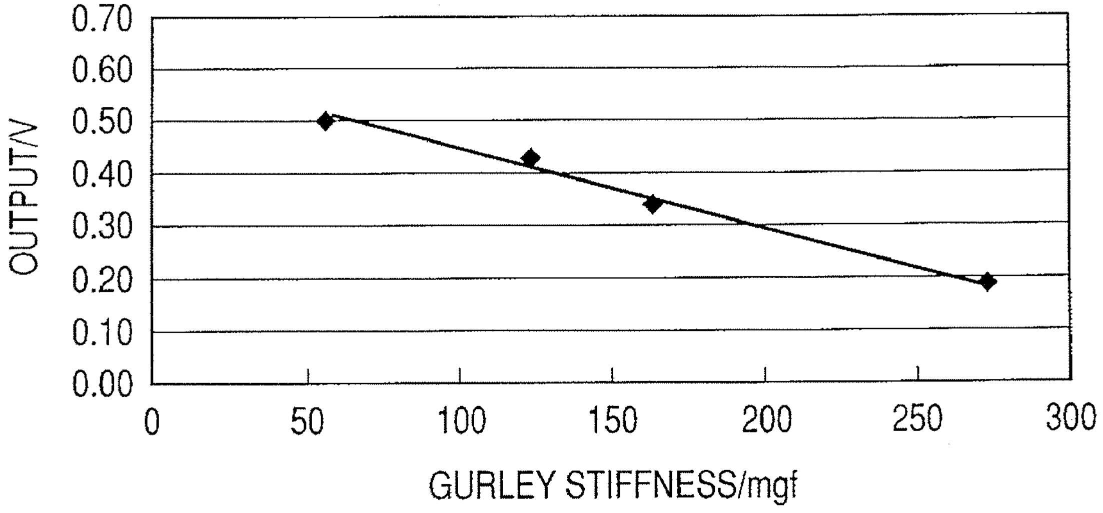
FIG. 6 illustrates the measured results of stiffness of sheets.
Figure 7:
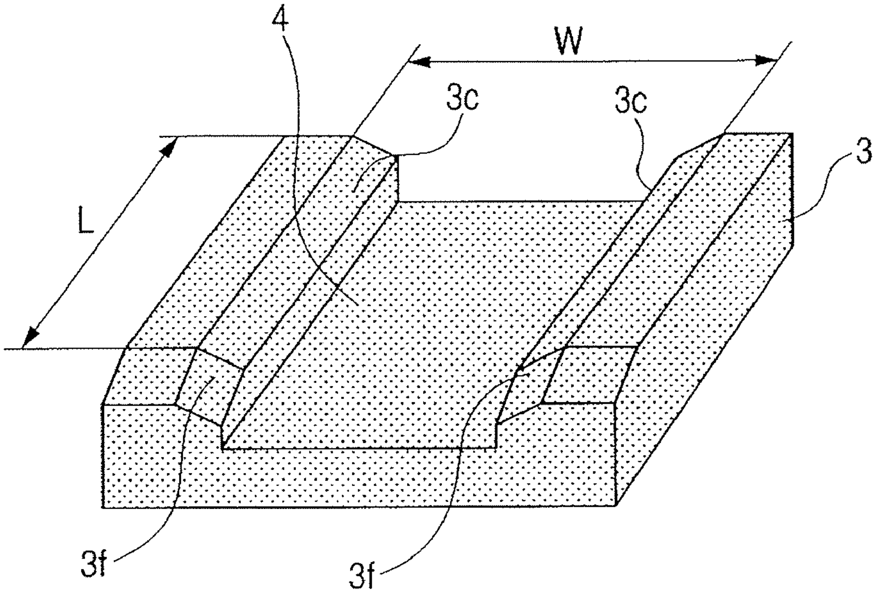
FIG. 7 is a perspective view of the receiving member.
Figure 11:
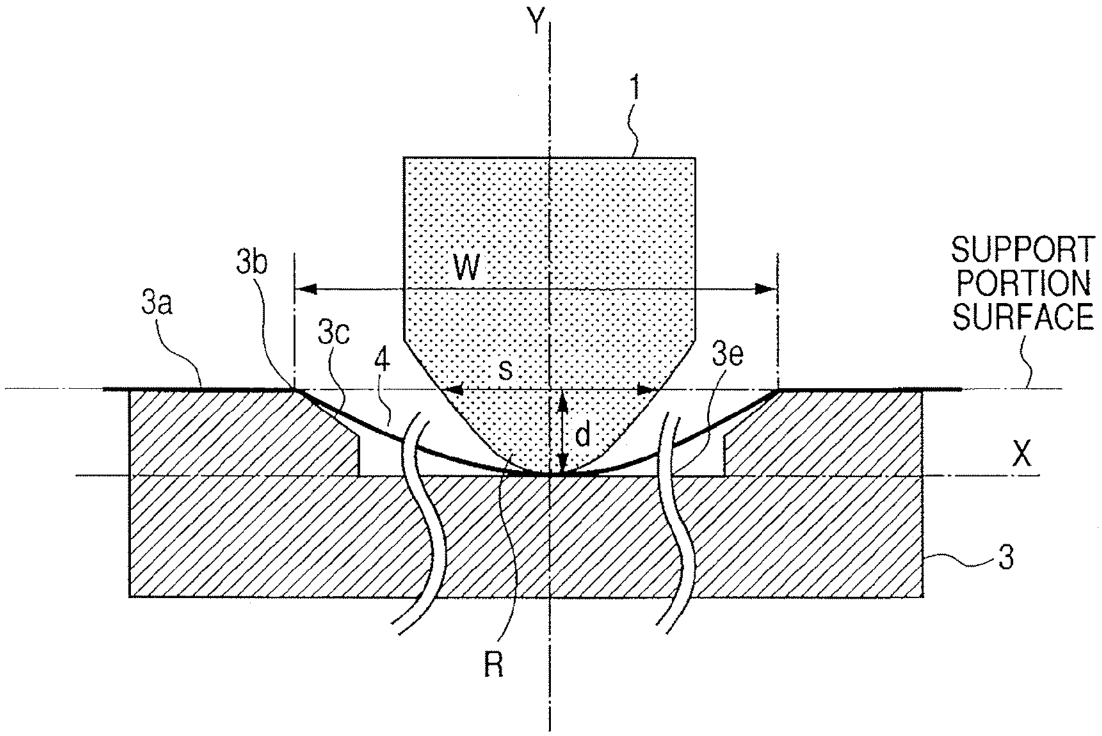
FIG. 11 illustrates other exemplary forms of the receiving member and the application member.

FIG. 1 illustrates the construction of a sheet information output apparatus according to an embodiment of the present invention, FIG. 2 illustrates the forms of a receiving member 3 and an application member 1, FIG. 3 is a flow chart illustrating detection of sheet information, FIG. 4A to FIG. 4C illustrate the process of detection of impact through a sheet, FIG. 5A and FIG. 5B illustrate output waveforms of the sheet information output apparatus, FIG. 6 illustrates the measured result of stiffness of a sheet, FIG. 7 is a perspective view of the receiving member 3, and FIG. 11 illustrates other exemplary forms of the receiving member 3 and the application member 1. In FIG. 4A to FIG. 4C, FIG. 4A illustrates a state that external force has started to be applied onto a sheet P, FIG. 4B illustrates a state that the sheet P has been caused to be bent, and FIG. 4C illustrates a state that the sheet P has been caused to be compressed. In FIG. 5A and FIG. 5B, FIG. 5A illustrates a waveform of output in the absence of the sheet P, and FIG. 5B illustrates a waveform of output when external force has been applied onto the sheet P.

As illustrated in FIG. 1, in the sheet information output apparatus 30 according to this embodiment, the application member 1 is caused to impact on the surface of the sheet P, and the impact over the sheet P is received in an external-force-detecting portion 2 to take output according to the impact force out of the external-force-detecting portion 2.

A pair of lower sheet guides 10 are fixed to a pedestal 8 of the sheet information output apparatus 30, and upper sheet guides 9 are arranged above the lower sheet guides 10 in opposition to the lower sheet guides 10. The sheet P is conveyed between the lower sheet guides 10 and the upper sheet guides 9 from the front side toward the back side in this drawing.

The receiving member 3 is arranged between the pair of the lower guides 10, and the application member 1 is arranged upward the receiving member 3. The application member 1 is arranged in opposition to the depressed portion 4 of the receiving member 3 and caused to strike toward the depressed portion 4 by a drive mechanism 25. The receiving member 3 is arranged on a fixing member 7 fixed to the center of the pedestal 8, and a pressure-sensitive element 5 is arranged between the receiving member 3 and the fixing member 7.

As illustrated in FIG. 2, the depressed portion 4 that is a parallel groove extending through in the conveyance direction of the sheet P is formed in the receiving member 3. A slope face 3*c* is connected to an inner edge 3*b* of each support portion 3*a* of the receiving member 3, and left and right slope faces 3*c* are linked to a bottom face 3*e* through respective vertical portions. Assuming that the depth of the depressed portion 4 is d, the groove width is W, and the diameter of the application member 1 is s, the depressed portion 4 satisfies the relationship of $(W-s)/2>5d$. In other words, the groove width W of the depressed portion 4 is sufficiently wide compared with the depth d of the depressed portion 4. Incidentally, in FIG. 2, W, d and s of the depressed portion 4 in the receiving member 3 are drawn differently from the actual dimensional ratio for the sake of easy understanding of description.

When the tip of the application member 1 is caused to have a large curved surface or taper to the depressed portion 4 as illustrated in FIG. 11, the diameter s is the length in the groove width direction in the section at the height d from the tip. In other words, the diameter s is the sectional diameter of the application member 1 at the surfaces of the support portions 3*a* when the application member 1 is brought into contact with the bottom face 3*e*.

The gradient of the slope face 3*c* in the depressed portion 4 is set within such a range that the sheet P does not come into contact with the slope face 3*c* when the sheet P is pressed on the bottom face 3*e* by the application member 1. Likewise, a cylindrical face R is formed on the tip of the application member 1 so as not to press the sheet P hard against the edge of the application member 1 when the sheet P is pressed on the bottom face 3*e* by the application member 1. Incidentally, in FIG. 11, W, d and s of the depressed portion 4 in the receiving member 3 are drawn differently from the actual dimensional ratio for the sake of easy understanding of description. Likewise, W, d and s of the depressed portion 4 in the receiving member 3 illustrated in each of the drawings in the present invention are drawn differently from the actual dimensional ratio.

The inner edge 3*b* at which the slope face 3*c* connects to the support portion 3*a* is formed as a cylindrical face having such a small radius of curvature that the dual hold span of the sheet P bent and deformed is not changed to avoid the formation of a knife edge that becomes the cause of unnecessary friction.

<Sheet Information Detecting Procedure>

A control portion 21 serves to convey the sheet P to the lower sheet guides 10 to locate the sheet P on the receiving member 3 and to operate the drive mechanism 25 to strike the application member 1 on the sheet P. The pressure-sensitive element 5 receives a pressing force from the above through the receiving member 3 and outputs electric signals firstly corresponding to deflection reaction force of the sheet and then corresponding to compression reaction force thereof. The output from the pressure-sensitive element 5 is converted to voltage signals according to the pressing force by a conversion circuit 23, and a peak value of the voltage signals is detected by a processing circuit 22. The control portion 21 distinguishes the stiffness of the sheet P on the basis of this peak value.

As illustrated in FIG. 3, the application member 1 caused to strike by the drive mechanism 25 comes into contact with the sheet P and presses the sheet P downward (S10). Thus, the sheet P is caused to be bent downward (S20), and the deflection reaction force (stress) is detected by the pressure-sensitive element 5 (S21). Thereafter, when the deflection of the sheet P reaches the bottom face 3*e* of the depressed portion 4 (S30), the sheet P is held under pressure between the application member 1 and the receiving member 3 to compression-deform the sheet P (S40), and the compression reaction force (stress) of the sheet P is detected by the pressure-sensitive element 5.

In the process of causing the sheet P to be bent downward (S20 in FIG. 3), the sheet P is pressed by the application member 1 as illustrated in FIG. 4A, and the sheet P is brought into contact with the sheet support portions 3*a* in the receiving member 3 and then pressed into the depressed portion (FIG. 2) as illustrated in FIG. 4B to cause the sheet to be bent and displaced downward. At this time, the sheet P comes into contact with the inner edge 3*b* of the receiving member 3 to bias the receiving member 3 downward, thereby generating a pressure in the pressure-sensitive element 5.

In the process of causing the sheet P to be compression-deformed (S40 in FIG. 3), the sheet P is brought into contact with the bottom face 3*e* of the depressed portion (FIG. 2) as illustrated in FIG. 4C. At the contact place (bottom face 3*e*) between the sheet P and the receiving member 3, the sheet P is compressed to bias the receiving member 3 downward, thereby generating a pressure in the pressure-sensitive element 5.

By the way, such deformation as illustrated in FIG. 4A to FIG. 4C may not be completed according to the material of the sheet P, the intensity of the external force, the form of the groove and/or the like. For example, when the sheet is too hard, in the process of causing the sheet P to be bent as illustrated in FIG. 4B, great repulsive force may be applied onto the application member 1, and so the application member 1 may be caused to recoil before it impacts on the bottom face 3*e* of the depressed portion 4. In the process of causing the sheet P to be compression-deformed as illustrated in FIG. 4C, only a small pressure may also be generated in the pressure-sensitive element 5.

In these cases, the process of causing the sheet P to be compression-deformed as illustrated in FIG. 4C is substantially lost, so that it is impossible to conduct detection of sheet information making use of the output from the pressure-sensitive element 5 in the process of causing the sheet P to be compression-deformed. However, the information that the sheet P has a stiffness of a certain degree or higher has been already gained, and a great pressure is generated in the pressure-sensitive element 5 in the process of causing the sheet P to be bent as illustrated in FIG. 4B, so that more detailed sheet information can be detected on the basis of the output from the pressure-sensitive element 5 in the process of causing the sheet P to be bent.

When the sheet P is too soft on the contrary, almost no pressure is generated in the pressure-sensitive element 5 in the process of causing the sheet P to be bent as illustrated in FIG. 4B, so that only output of noise level or lower may be obtained in some cases. In this case, the information that the sheet P is soft has been already gained, and a great pressure is generated in the pressure-sensitive element 5 in the process of causing the sheet P to be compression-deformed as illustrated in FIG. 4C, so that more detailed sheet information can be detected on the basis of the output from the pressure-sensitive element 5 in the process of causing the sheet P to be compression-deformed.

More specifically, the receiving member 3, in which the depressed portion 4 has been formed, is employed, whereby the stiffness of the sheet P can be distinguished into three ranks, i.e., 1) the sheet P is so hard that no output is obtained from the pressure-sensitive element 5 in the process of the compression, 2) the sheet P is so soft that no output is obtained from the pressure-sensitive element 5 in the process of the bending and 3) the sheet P is at a level between them. The output in the process of the bending is used when 1) the sheet P is so hard that no output is obtained from the pressure-sensitive element 5 in the process of the compression, or the output in the process of the compression is used when 2) the sheet P is so soft that no output is obtained from the pressure-sensitive element 5 in the process of the bending, whereby detailed sheet information can be detected within respective ranges.

In other words, for a sheet P composed of a thick paper and having a great flexural stiffness, the quantity of energy absorbed by the paper is great, so that the stress transmitted from the receiving member 3 to the pressure-sensitive element 5 becomes small, and the maximum voltage becomes small. On the other hand, for a sheet P composed of a thin paper and having a small flexural stiffness, the quantity of energy absorbed by the paper is small, so that the stress transmitted from the receiving member 3 to the pressure-sensitive element 5 becomes great, and the maximum voltage becomes great.

As described above, the stiffness in the bending direction of the sheet P varies depending on the basis weight (basis weight=weight per unit area) of the sheet P, the material of the sheet P, and the like even when the impact energy applied onto the sheet P by the application member 1 is the same, so that the maximum voltage outputted varies according to the kind of the sheet.

EXAMPLE 1

The external-force-detecting portion 2 of the sheet information output apparatus 30 in EXAMPLE 1 was designed in the following manner. As the receiving member 3, was used that illustrated in FIG. 7 with a tapered groove having a groove width W of 10 mm, a length L of 10 mm and a depth d of 0.3 mm formed as the depressed portion 4 in a plate material composed of a stainless steel (SUS316) and having a width of 15 mm, a length of 10 mm and a thickness of 1.5 mm. A slope face 3*c* having a width of 0.5 mm was provided at a gradient of 10% on each edge of the sidewalls of the depressed portion 4. Further, a release face 3*f* comprised of a gentle slope structure was provided on one side end of the receiving member 3.

As the pressure-sensitive element 5, was used an element of a structure in which PZT (lead titanate zirconate) that is a piezoelectric material is vertically held between silver electrodes. The piezoelectric material was sized into a length of 5 mm, a width of 3 mm and a thickness of 0.3 mm. As the fixing member 7, was used a plate material composed of a stainless steel (SUS316) and having a width of 15 mm, a length of 10 mm and a thickness of 1.5 mm.

Such receiving member 3, pressure-sensitive element 5 and fixing member 7 were laminated on one another with an adhesive comprising an epoxy resin as a principal component, and the fixing member 7 was bonded to the pedestal 8. As the pedestal 8, was used that obtained by imbedding a metal weight (not illustrated) in a highly heat-resistant resin having high stability of hardness in the vicinity of room temperature. The metal weight has such an effect that sufficient inertial mass to the external force applied is imparted to the device portion including the pedestal to stabilize the output signal.

As illustrated in FIG. 1, the pedestal 8 is fixed to a case of a sheet processing apparatus (not illustrated) through a damper (O-ring-like rubber material; not illustrated). The lower sheet guides 10 were provided on the pedestal 8, and the upper sheet guides 9 were provided in opposition to the lower sheet guides 10.

The lower sheet guides 10 and the upper sheet guides 9 are located at positions where the sheet P is held and brought into contact with the receiving member 3, and impart tension to the sheet P during at least a period of external force application to remove unnecessary waving.

The application member (hammer) 1 for applying external force to the sheet P was arranged at a position opposed to the receiving member 3. As the application member 1, was used a stainless steel material (SUS316) having a mass of 4 g, and a spherical surface having a radius of 20 mm was machined on a tip side to impact on the sheet P The application member 1 is held at a position where the tip thereof is located about 2 mm away from the sheet P except when the external force is applied, and is accelerated by the drive mechanism 25 when applying external force to impart impact force as the external force to the sheet P. The drive mechanism 25 was so constructed that the application member 1 supported by a rotary bearing is accelerated by a motor and a cam (both, not illustrated).

In EXAMPLE 1, the external force was applied twice on one detection of sheet information. In the first application of external force, the application member 1 was accelerated to 0.5 m/sec and caused to impact on the sheet P. After the first application of external force, the application member 1 was separated once from the sheet P, and thereafter, the second application of external force was further conducted. In the second application of external force, the application member 1 was accelerated to 0.2 m/sec and caused to impact on the sheet P. After the second application of external force, the application member 1 was returned to the original position remote from the sheet P. The first application of external force and the second application of external force were conducted in a condition that the sheet P was conveyed at a rate of 0.2 m/sec in a direction corresponding to the back side in the drawing, and the interval between the first and second applications of external force was 0.1 second.

The operation of the sheet information output apparatus 30 according to EXAMPLE 1 will be described. The application member 1 is first caused to impact twice on the receiving member 3 under the above-described conditions with no sheet P present, thereby applying external force. An output voltage (hereinafter referred to as "signal in the absence of Sheet P") from the pressure-sensitive element 5 (conversion circuit 23) at this time is stored in a memory portion imparted to the control portion 21. The signal in the absence of Sheet P is used as a reference signal for comparing with output when the sheet P is held, which will be described subsequently. In EXAMPLE 1, a voltage waveform having a peak value of 11.0 V was obtained as shown in FIG. 5A.

The signal in the absence of Sheet P is also used as detection of the condition of the sheet information output apparatus 30 itself. For example, when the value of the signal in the absence of Sheet P exceeds a prescribed range, the sheet information output apparatus 30 is recognized as abnormal, and such a processing that fault is indicated, command of adjustment or exchange is displayed, or the operation of the sheet processing apparatus (not illustrated) is changed over to a mode that the sheet information output apparatus 30 is not used is then executed.

When paper is used as the sheet P, dust (hereinafter referred to as paper dust) produced from the paper may adhere in some cases. In the case of an apparatus making use of a powder toner, such as a laser beam printer or copying machine, the toner flown off may adhere in some cases. As a result, lowering of the performance of the sheet information output apparatus 30 may be incurred. However, proper oscillation is produced by the application of external force in a condition that no sheet P is present; whereby the paper dust or toner can also be caused to fall down to conduct cleaning.

The application member 1 is then caused to impact twice on the receiving member 3 under the above-described conditions in a condition that a sheet P is held, thereby applying external force. In EXAMPLE 1, a voltage waveform having a peak value of 3.5 V was obtained as illustrated in FIG. 5B. In this embodiment, an example where the application of external force is conducted under the conditions of the first application of external force, and paper for copying (product of Xerox Co., trade name "PREMIUM MULTIPURPOSE 4024 PAPER", 75 g/m$^2$) was used as the sheet P is shown.

In FIG. 5B, region A is a time region when the sheet P is deflection-deformed before the tip of the application member 1 enters the depressed portion 4 of the receiving member 3 and impacts on the bottom face 3*e*, and region B is a time region after the application member 1 impacts on the bottom face 3*e* of the depressed portion 4 through the sheet P.

In region A, such an output that a voltage generated gradually increases is obtained. This is a voltage generated by gradually bending and deforming the sheet P as illustrated in FIG. 4B and gradually increasing a pressure applied to the pressure-sensitive element 5 according to this deformation. In EXAMPLE 1, the fact that the voltage generated in the vicinity of the terminal of region A is 0.32 V was detected as a characteristic quantity in region A. Incidentally, in region A, the application member 1 is decelerated by the bending resistance of the sheet P, so that region A becomes long compared with that in the absence of the sheet P as shown in FIG. 5A.

As shown in FIG. 5B, a peaked voltage is generated in region B, but immediately attenuated. This corresponds to the behavior that the application member 1 impacts on the receiving member 3 through the sheet P, and recoils and separates. At this time, the sheet P is deformed in its compressed direction in the thickness-wise direction thereof to obtain output reflecting the mechanical properties of compression. In EXAMPLE 1, the fact that the voltage generated at a peak in region B is 3.50 V was detected as a characteristic quantity in region B.

An output waveform in the second application of external force was further processed in the same manner. Although a chart of the waveform was omitted, the voltage generated in the vicinity of the terminal of region A by the second application of external force was 0.20 V, and the voltage generated at a peak in region B was 1.20 V.

FIG. 6 illustrates examples where the deflection stiffness of various kinds of sheet A was measured by the sheet information output apparatus 30 according to EXAMPLE 1. In FIG. 6, peak output voltages (V) in region B as shown in FIG. 5B are compared with the found values of stiffness as to these sheets P by conducting the above-described application of external force and output detection on the various kinds of sheet P by the sheet information output apparatus 30 according to EXAMPLE 1.

Incidentally, in FIG. 6, the peak voltage when the application member 1 of 4 g was caused to impact on the sheet P at 0.2 m/sec is compared with the found value (unit: mgf) measured by a Gurley Stiffness Tester manufactured by KUMAGAI RIKI KOGYO CO., LTD. However, since such a process that unnecessary frequency bands are cut through an electrical filter is conducted on the output waveform shown in FIG. 5B, the peak value itself is smaller than that shown in FIG. 5B.

The sheet information output apparatus 30 according to EXAMPLE 1 converts an output voltage value from the external-force-detecting portion 2 into a signal corresponding to the stiffness H (rigidity) of the sheet P to output it. Property information such as stiffness H of the sheet P is distributed to proper terminal voltages (for example, 0 V to 5 V) to be converted and output, or output and displayed by a proper display device. In EXAMPLE 1, the stiffness H of the sheet P can be generally converted from the output voltage Vp shown in FIG. 6 in accordance with the following equation using 'A' and 'B' as constants.

Stiffness H (mgf)=A×[output voltage Vp (V)]+B. In the example shown in FIG. 6, 'A' is about −667, and 'B' is about −400.

Incidentally, when the sheet P is paper, the output voltage Vp has a dispersion of several % to the above-described value due to the distribution of thickness caused by ununiformly made paper or the like. However, the values in the detection of plural times may be averaged as needed to measure the sheet information with higher accuracy.

The condition that the deformation of the sheet P in EXAMPLE 1, which has been described above, is expressed as $Y=AX^2$ in the sectional direction of the sheet P, wherein X is deflection in the width direction of the sheet P, and Y is deflection in the thickness-wise direction of the sheet P, was verified by analyzing a high-speed photographed image. The observation method comprises printing grid-pattern lines in advance on a sheet P and photographing it slantwise from the above by a high-speed camera (manufactured by PHOTRON LIMITED, FASTCAM-512PCI NOTEPACK MODEL). The deformation of the grid line in the photographed image was periodically analyzed, thereby confirming that a portion of the sheet P on the grooved structure becomes deformed on the line of $Y=AX^2$

EXAMPLE 2

In EXAMPLE 2, an example where the sheet information output apparatus 30 was installed in a laser beam printer is described. In the laser beam printer of EXAMPLE 2, the sheet information output apparatus 30 was provided between a sheet cassette and a transfer unit within a sheet conveyance line, and the processing circuit 22 was provided in a control circuit within the printer. The control circuit that is a microcomputer control unit serves to take a sheet P out of the sheet cassette prior to image formation and convey the sheet P between the lower sheet guides 10 and the upper sheet guides 9. In the same manner as in EXAMPLE 1, the sheet P is located on the receiving member 3, and the application member 1 is caused to strike on the sheet P to detect sheet information.

The sheet P, the sheet information of which has been detected by the sheet information output apparatus 30, is successively conveyed to an image forming process portion including the transfer unit to be used in image formation. The control circuit in the laser beam printer program-controls the image forming process portion to form an image on the sheet P. The control circuit distinguishes the stiffness of the sheet P on the basis of the peak value of an output waveform to optimize processing conditions in the image forming process portion. For example, a conveying speed, developing conditions, fixing conditions (temperature and temperature distribution) and the like adapted to the stiffness of the sheet P are determined, whereby image formation such as printing is executed on the sheet P with an optimum recording mode for the sheet P In the laser beam printer of EXAMPLE 2, printing was conducted under optimum printing conditions for the sheet P. Electric power supplied for heating a fixer is controlled in the printing conditions. The properties of the sheet P participating in the deflection stiffness of the sheet P include thickness, Young's modulus, water content and difference in long-grain/short-grain as main properties. These properties also have very close relation to physical properties of the sheet P, i.e., thermal physical properties and electrical properties, so that such control as EXAMPLE 2 becomes feasible. As a result, a toner was able to be well fixed to form a proper image, and moreover good printing little in curling was able to be performed.

Incidentally, various kinds of mechanisms and devices including a photosensitive drum (not illustrated), and a great number of motors, actuators and controlling sensors for driving them are arranged in the image forming process portion and connected to the control circuit. However, with respect to the detailed construction and control of the laser beam printer, their detailed descriptions are omitted because they somewhat depart from the subject matter of the present invention.

<Detailed Description of Constructional Members>

Figure 8:
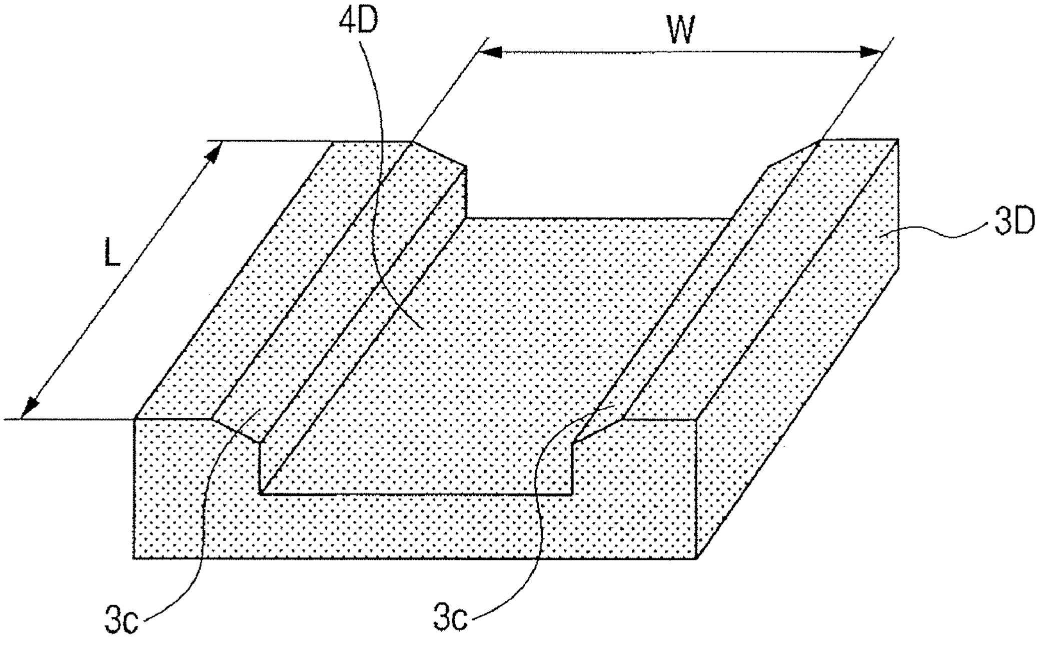
FIG. 8 is a perspective view of a receiving member according to another embodiment.
Figure 9:
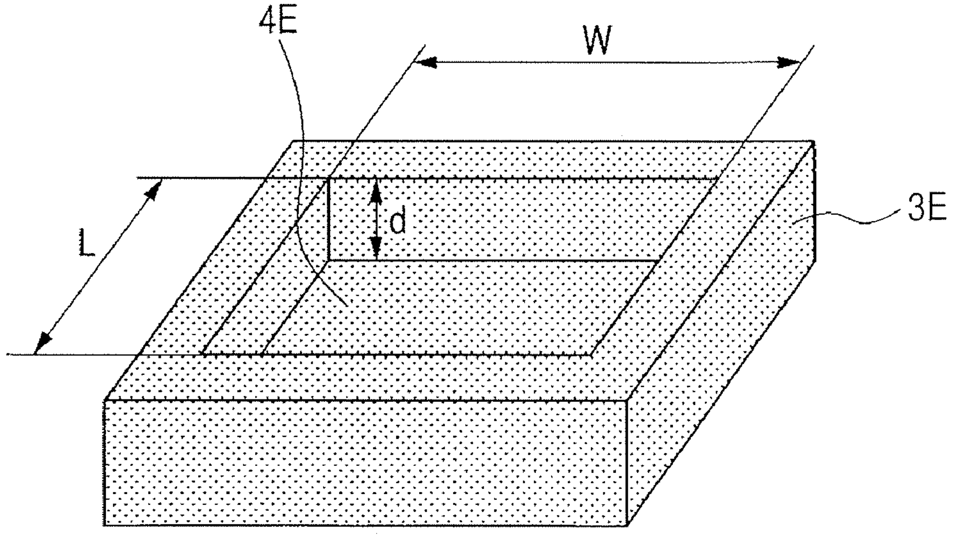
FIG. 9 is a perspective view of a receiving member according to a further embodiment.
Figure 10:
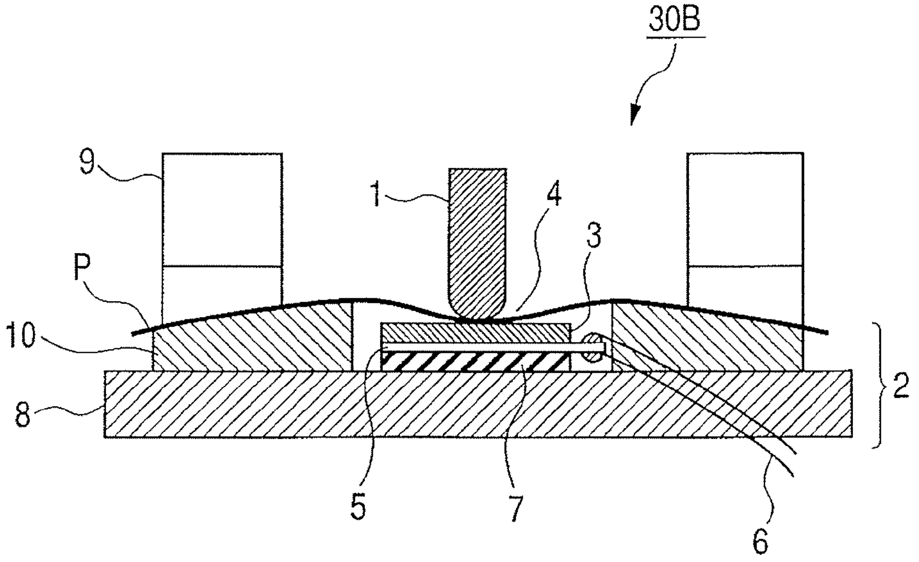
FIG. 10 illustrates the construction of a sheet information output apparatus according to another embodiment.

Respective elements of the sheet information output apparatus 30 according to this embodiment will hereinafter be described. FIG. 8 is a perspective view of a receiving member according to another embodiment, FIG. 9 is a perspective view of a receiving member according to a further embodiment, and FIG. 10 illustrates the construction of a sheet information output apparatus according to another embodiment. In each figure, the same reference numerals are given to the same members as those in FIG. 1 to FIG. 7, and their detailed descriptions are omitted.

As illustrated in FIG. 1, the application member 1 is made of a metal rod or the like, has a prescribed mass and is caused to impact on the sheet P by being accelerated by a spring or the like to give impact to the sheet P and the external-force-detecting portion 2. The mass of the application member 1 is preferably from about one tenth of the weight of an area to be measured in the sheet P to about 10 times as much as the weight of the area. For example, when the object of detection is letter-sized paper (about 215.9×279.4 mm) having a basis weight of about 100 g/m$^2$, the weight is preferably in a range of from 0.5 g to 50 g.

The impact speed is controlled to a value sufficient to deform the sheet P. The impact speed varies according to the mass of the application member 1 and presence of acceleration such as gravity, and is preferably within a range of from 0.05 m/sec to 5 m/sec so far as the object of detection falls within the above range. When the object of detection is thinner, both mass of the application member 1 and impact speed take values smaller than the above values. When the object of detection is thicker, they take values greater than the above values. In any event, the impact speed is determined within such a range that breakage of the sheet P does not occur, preferably such a range that impact marks or folding is not left on the sheet P.

The application member 1 is preferably composed of a rod material having a curved surface at a tip portion to come into contact with the sheet P. The application member 1 is preferably caused to strike on the sheet P from the normal direction of the sheet in that stable deformation is given to the sheet P without giving unnecessary deformation such as torsion. The rod material provides easy linear control, and the provision of the curved surface at the tip portion stabilizes its contact area with the sheet P even when the angle deviates by the influence of assembly tolerance or the like.

The application member 1 preferably has such a structure that the sheet P is bent and displaced in the vicinity of the center of the narrowest portion of the depressed portion 4. The sheet P is bent and displaced in the vicinity of the center, whereby the deformation quantities of both sides of the sheet P are generally equal to each other, and the behavior is stabilized, so that detection becomes feasible with higher accuracy. However, it is not necessary that the position of the displacement is exactly central, and it is a matter of course that some deviation by assembly tolerance or the like is allowed.

The radius of curvature of the curved surface P at the tip portion of the application member 1 is preferably sufficiently small compared with the radius of curvature of bending of the sheet P by deformation. By arranging so, the edge of the application member 1 directly comes into contact with the sheet P to prevent unstable deformation.

The form of the application member 1 is preferably a pillar such as a column or prism. No particular limitation is imposed on the diameter of the section of the application member 1 so far as the relationship according to the present invention is satisfied. However, the diameter is preferably designed in such a manner that the diameter is fixed or reduced continuously or stepwise from the position of the height d toward the tip of the application member 1. When the diameter of the application member 1 remarkably increases toward the tip of the application member 1, the deflecting form of the sheet P is changed (causing unstable deformation by being restrained by the form of the application member). Even when the diameter of the application member 1 is designed so as to increase toward the tip of the application member 1, however, the diameter of the tip of the application member can be large so far as the size of the tip portion of the application member 1 does not adversely affect the deflecting form of the sheet P. For example, the tip of the application member 1 may be made spherical, and any other portion than the tip may be formed into a column having a diameter smaller than the diameter of the section of the tip portion. In other words, the size of the portion coming into contact with the sheet P in the application member 1 is preferably designed so as to become sufficiently small compared with the radius of curvature of bending of the sheet P by deformation.

As a preferred mode in this embodiment, may be mentioned to continuously conduct application of external force plural times by means of a hammer type application member cantilevered by a plate spring. This can be realized by, for example, a mechanism that energy stored in the spring is released over plural times by a multi-stage cam or the like, thereby continuously causing impact plural times.

When the value of the external force (for example, impact speed) is fixed upon the respective impacts, the accuracy of the information can be enhanced by conducting statistical processing of, for example, averaging output values from the external-force-detecting portion 2. When the value of the external force is varied upon the respective impacts, the reaction of the sheet P varies every impact, so that more-multiple information can be obtained.

The application member 1 is preferably such that a solid mechanical part is brought into contact with the sheet P to apply external force to the sheet P. However, it may be such a construction that a fluid such as air is blown. Examples of the driving source of the application member 1 include those with which the application member 1 is driven by mechanical or electromagnetic energy, for example, mechanical means such as gravity or spring, and electromagnetic means such as motors, solenoids or voice coils, and combinations of these means with converting mechanisms such as cams, shafts and gears. As the most preferred mode example, may be mentioned such a construction that a hammer supported by a rotary bearing is accelerated by a motor and a cam.

As a method for applying external force, may be mentioned, in addition to 1) a method of causing the application member 1 to impact on the sheet P from a separate position like this embodiment, 2) a method of applying impact force to the sheet P from the application member 1 in a condition that the application member 1 has been brought into contact with the sheet P. In other words, it is necessary for the application member 1, the sheet P and the receiving member 3 to necessarily come into contact with each other at the same time once in the process of detecting sheet information. However, a positional relation among them may be arbitrarily set at any other time than this time.

Examples of a method for applying the external force by the application member 1 include 1) a method of conducting the application in a condition that the conveyed sheet P has been stopped once like this embodiment, and besides 2) a method of conducting the application in a stationary condition that the sheet P has been stored in a cassette or stocker and 3) a method of conducting the application in a traveling condition that the sheet P is being conveyed.

When the external force is applied to the sheet P in the traveling condition that the sheet P is being conveyed, the application member 1 and the surface of the sheet P touches each other, so that surface conditions of the sheet P can also be detected. When the external force is applied to the sheet P in the stationary condition on the other hand, a noise component attending on the traveling of the sheet P can be reduced in the external-force-detecting portion 2. Accordingly, it is only necessary to suitably design and control the place and condition that the external force is applied according to the kind and accuracy of information required.

As the external force, may be used either only one external force or plural kinds of external force. The information of the sheet P may be obtained by applying the external force either once or plural times. When the application of the external force is conducted plural times (i.e., when only one external force is applied plural times, or plural kinds of external force are applied at different timings), a plurality of data are obtained as described above, so that distinguishing accuracy is also raised. Incidentally, when the application of the external force is conducted plural times, the next external force is preferably applied after the waving of the sheet P by the external force applied once is sufficiently attenuated, or lowered to a prescribed value or lower.

The external-force-detecting portion 2 has at least the receiving member 3 and the pressure-sensitive element 5, and the receiving member 3 has the depressed portion 4. The receiving member 3 according to this embodiment is a member for receiving the external force from the application member 1 directly or through the sheet P and transmitting it to the pressure-sensitive element 5. This member can control the deformation quantity of the sheet P deformed by the application of the external force within a prescribed range to detect the mechanical properties (bending and compression) of the sheet P with good accuracy.

The receiving member 3 and the pressure-sensitive element 5 are bonded to each other at their surfaces. However, in order to develop the function of this embodiment, the receiving member 3 and the pressure-sensitive element 5 are not always those obtained by bonding separate members. For example, they may be so constructed that the receiving member 3 becomes a part of the pressure-sensitive element 5, or the receiving member 3 and the pressure-sensitive element 5 are bonded to each other through some intermediate transmission member. Such construction brings about the same effect. In short, the external-force-detecting portion 2 is bonded to the fixing member 7 as needed.

The materials and forms of the receiving member 3, the pressure-sensitive element 5 and the fixing member 7 are suitably selected, whereby the element properties of the external-force-detecting portion 2 are suitably determined. As a preferred example, a piezoelectric ceramic plate is used as the pressure-sensitive element 5, materials having sufficiently higher stiffness than the pressure-sensitive element 5 are used for the receiving member 3 and the fixing member 7, and whereby a deformation mode in which the pressure-sensitive element 5 is compressed mainly in the thicknesswise direction thereof by the external force by the application member 1 is used.

Another preferred example using the piezoelectric ceramic as the pressure-sensitive element 5 is a constitutional form that takes a deformation mode in which the pressure-sensitive element 5 mainly expands and contracts in response to bending deformation of the receiving member 3. As such a constitutional form, there is a form in which an elastic body having such elasticity that the pressure-sensitive element 5 is deflection-deformed is used in the receiving member 3, and an elastically deforming material, for example, rubber or the like, is used in the fixing member 7, or a form in which only one end of the pressure-sensitive element 5 is fixed by the fixing member 7.

Wiring 6 is drawn out of the pressure-sensitive element 5. As the wiring 6, is used a material having high flexibility so as not to unnecessarily restrain the pressure-sensitive element 5.

The external-force-detecting portion 2 is suitably fixed to the pedestal 8. The pedestal 8 preferably has high stiffness and high temperature stability, and a material thereof is suitably selected from metals and resins. In order to moderately damp vibration, it is also preferable to lay a vibration proofing material. A position where the vibration proofing material is laid may be any position so far as unnecessary vibration can be damped.

The receiving member 3 is comprised of a material that has sufficient durability to the external force applied and can transmits the external force in a certain quantity or more to the pressure-sensitive element 5. Preferred materials include metals, resin materials and the like.

The depressed portion 4 provided in the receiving member 3 is formed in such a manner that the sheet P can be bent and displaced in the depressed portion 4 by the external force applied by the application member 1. The depressed portion 4 may be constructed by forming a tapered groove in a surface of the receiving member 3, to which the sheet P is opposed. In this case, the sheet P can be bent and displaced in the depressed portion 4 by the external force applied, and moreover the surface of the sheet P can be pressed against the bottom face 3*e*. The sectional form of the depressed portion 4 may be any of a rectangle, saw tooth form and curved surface and is suitably designed as necessary for the end application intended.

The depressed portion 4 is not limited to such a groove form as described in this embodiment, and it may be a depression form the length in the depth direction of which is limited. For example, in such a receiving member 3E of a plate member as illustrated in FIG. 9, may be provided, as a depressed portion 4E, a rectangular hole-shaped depression having a width W, a length L and a depth d. Incidentally, a slope face or chamfer (not illustrated) is formed between four rectangular rising faces constituting the depression and the upper face.

In such a receiving member 3D of a plate member as illustrated in FIG. 8, may be formed, as a depressed portion 4D, a tapered groove type groove having a groove width W, a length L and a depth d, and a slope face 3*c* may be provided on each edge of sidewalls of the depressed portion 4D.

For the depressed portion 4, the depth d and the groove width W preferably fall within respective ranges of $0<d<10t$ and $10t<W<1000t$ with respect to the thickness t of the sheet P that is an object of detection. By forming the depressed portion in such a manner, irreversible deformation is not given to the sheet P, and deflection stiffness can be stably measured.

Although the edges of the sidewalls of the depressed portion 4 are abraded by friction with the sheet P, and the form thereof is changed to change the relationship among the groove width W, the length L and the depth d, the slope face 3*c* is provided for the purpose of substantially inhibiting the dimensional change of the depressed portion 4 by this abrasion.

The slope face 3*c* will be further described. In the present invention, the depressed portion 4 is provided for the purpose of deflecting the sheet P. The sheet P may be approximately considered as a plate spring that comes into contact with two upper portions of the depressed portion 4, and is deformed within the depressed portion by the external force using those portions as supporting points. In other words, it is a phenomenon that a sheet having a width corresponding to the groove width W of the depressed portion causes deflection deformation by the depth d. In this process, the external force is reduced by a quantity corresponding to the spring power [qualitatively, (spring constant that is a property of a sheet material)×(deformation quantity)] of the sheet P and reaches the external-force-detection portion 2, so that an output value reflecting the property of the sheet P is obtained.

However, if the depth d of the depressed portion is reduced by the abrasion of the upper portions, or the like, the quantity of deflection deformation is also reduced, so that the output varies (increases). In order to lessen an error in the detection of sheet information by this variation, the receiving member is formed in such a form that the distance between the supporting points of the sheet P, i.e., the groove width W, of the depressed portion is reduced so as to correspond to the reduction of the depth d of the depressed portion, and so the spring power is increased to offset the reduction.

Incidentally, when the sheet P is composed of an elastic body, the spring constant is univocally determined by the thickness of the sheet P and the above-described W and d, so that a preferred relationship between d and W, i.e., the form of the slope face provided on the depressed portion 4, is also univocally determined. However, when the sheet P is paper or the like used in image forming apparatus, the physical properties include viscosity and vary with conditions such as environmental humidity. Therefore, the present inventors have found that it is only necessary for the slope angle to fall within the prescribed range in order to detect sheet information with the accuracy necessary for control of an image forming apparatus or the like.

According to the finding by the present inventors, the slope face 3*c* preferably has a gradient of from 5% to 20%. More specifically, when a face linking a first supporting face and a second supporting face, on which the sheet P is bilaterally held by the support portion when the sheet P is deflection-deformed, is regarded as a reference face, the slope face 3*c* preferably has a gradient of from 5% to 20% with respect to the reference face.

The embodiment shown in FIG. 7, which has been described as EXAMPLE 1 is such that a release face 3*f* is further added to the embodiment shown in FIG. 8. The embodiment shown in FIG. 7 is particularly used for detecting the information of a sheet P that is being conveyed. The release face 3*f* is provided on a face (a face toward which the leading edge of the sheet P goes) of the receiving member 3, which is opposite to the traveling direction of the sheet P, for the purpose of releasing excess force generated by impact of the leading edge of the sheet P with the receiving member 3. The embodiment shown in FIG. 7 has an effect to prevent breakage of the pressure-sensitive element 5 or the sheet P to enables stable detection of sheet information even when the sheet P is conveyed at high speed.

The pressure-sensitive element 5 is an element to convert a mechanical action such as pressure or vibration to an electric signal. As the element to convert the mechanical action to the electric signal (electro-mechanical conversion), may be used an element of, for example, a semiconductor diaphragm type, electrostatic capacitance type, elastic body diaphragm type or piezoelectric type. However, as a preferred material, may be used an inorganic material or organic material having piezoelectric properties. For example, an inorganic material such as PZT (lead titanate zirconate), PLZT, BaTiO3 or PMN—PT($Pb(Mg_{1/3}Nb_{2/3})O_3$—$PbTiO_3$), or an organic piezoelectric material may be used. When a piezoelectric element is used, the external force is detected as a voltage signal. In this embodiment, the external-force-detecting means include a case where a detection element itself is directly exposed and a case where the element has coating or the like.

The pressure-sensitive element 5 may be an element to output an optical signal in place of the electric signal. In this case, the optical signal is also converted to an electric signal and subjected to distinguishing processing. Therefore, both are all the same as a sensor. As the element to convert the mechanical action to the optical signal, is used an element making use of the condition that reflection of light from a member, or transmission or polarization from the member is fluctuated by mechanical operation of the member. For example, there is a method in which a laser beam is caused to strike on a member, and a directional change of a reflected beam from the member is read out by a photo detector (partition photodiode or the like), thereby reading out the motion of the member. There is also a method in which two laser beams are caused to strike on a member to read out the moving velocity of the member from interference thereof (the so-called "laser Doppler velocimeter").

The fixing member 7 compresses the pressure-sensitive element 5 while opposing the pressing force of the receiving member 7. The fixing member 7 is suitably selected, whereby the information of the sheet P can be detected with higher efficiency. An embodiment using a thin plate of a piezoelectric ceramic as the pressure-sensitive element 5 will hereinafter be described.

For example, such an elastic body or viscoelastic body (rubber or the like) that deformation is caused by the force applied to the sheet P may be used as the fixing member 7. In this case, the pressure-sensitive element 5 and the receiving member 3 can substantially act as unimorph elements to mainly cause deflective deformation, thereby obtaining a relatively high voltage, so that they have an effect to improve S/N of signal processing.

For example, a rigid body may be used as the fixing member 7. In this case, the pressure-sensitive element 5 mainly causes compressive deformation. However, the pressure-sensitive element 5 is compressed as a whole against the force applied, so that a difference in generated voltage for positions to which external force is applied is small, which has an effect to reduce an individual difference in output oscillation by, for example, tolerance of element assembly.

It is also possible to select, as the fixing member 7, a member whose properties such as hardness, viscoelasticity and resistivity are properly changed by change in environment such as temperature or humidity. In this case, output can be changed according to the environment, so that variation in output by environmental change of the sheet P can also be corrected.

Accordingly, the fixing member 7 is preferably designed in such a form that unnecessary resonance is not caused by application of external force or vibration from the outside, and it is further preferable that vibration is shielded from the outside by a damper such as rubber.

The fixing member 7 preferably has an inertial mass of a certain degree or more in order to counteract against repulsion by the application of the external force. It is required to have at least a mass greater than that of the application member 1 and it preferably has a mass at least 5 times as much as the application member 1.

The lower sheet guides 10 are arranged at proper positions to the receiving member 3 to locate the sheet P at a prescribed height on the receiving member 3. The upper sheet guides 9 and the lower sheet guides 10 are mechanisms for holding the sheet P between them and control the interval between the sheet P and the receiving member 3 within a prescribed range upon the detection of information as to the sheet P. The upper sheet guides 9 and the lower sheet guides 10 inhibit unnecessary vibration of the sheet P, such as fluttering upon, for example, detection of information as to the sheet P in the course of conveying the sheet P.

In other words, the upper sheet guides 9 are arranged in combination with the lower sheet guides 10 for positioning the height of the sheet P, whereby the displacement of the sheet P in height can be controlled within a prescribed range upon the detection of sheet information. The deformation quantity given to the sheet P by the application member 1 can be thereby stabilized.

The upper sheet guides 9 are suitably comprised of an actuator which generates force for suitably displacing the sheet P, such as a spring or solenoid, and a vibration controlling material for inhibiting vibration of the sheet P, such as rubber, or a damping mechanism such as a weight having an inertial mass. A portion coming into contact with the sheet P is formed of a material little in friction and high in abrasion resistance. Since the sheet P produces unnecessary waving or deflection in a loose condition free of tension, the upper sheet guides 9 preferably have such a structure that proper tension is given to the sheet P, so as to make it possible to stably detect information.

<Processing Circuit, Sheet Processing Apparatus>

FIG. 5A and FIG. 5B illustrate exemplary voltage waveforms outputted from the sheet information output apparatus 30 (conversion circuit 23). FIG. 5A illustrates an output waveform in the absence of the sheet P, and FIG. 5B illustrates an output waveform in the case where the sheet P is held. In this case, paper (product of Xerox Co., trade name “PREMIUM MULTIPURPOSE 4024 PAPER”, 75 g/m$^2$) is used as the sheet P.

As shown in FIG. 5B, in the region A in the process of causing the sheet P to be bent and deformed when the sheet P is held, such an output that a voltage generated gradually increases is produced. In the region B in the successive process of causing the sheet P to be compression-deformed, the output voltage is rapidly raised to form a peak and attenuated shortly. This corresponds to the behavior that the application member 1 impacts on the receiving member 3 through the sheet P after the sheet P is gradually bent and deformed, and recoils and separates. However, in the case where the sheet P is not present, no voltage is generated in the region A as shown in FIG. 5A, and a voltage is generated in the region B.

The signals detected in this embodiment are voltage signals produced from the pressure-sensitive element 5 at the time the sheet P has come into direct contact with the receiving member 3. As shown in FIG. 5B, the signal in the region A is first outputted from the pressure-sensitive element 5 by the application of the external force by the application member 1, and the signal in the region B is successively outputted. In the region A, the force is transmitted to the inner edges 3*b* (FIG. 2) of the depressed portion 4 in the process of decelerating the application member 1 attending on the deflection of the sheet P, so that the pressure-sensitive element 5 is compressed. In the region B, the pressure-sensitive element 5 is compressed by successively pressing the sheet P against the bottom face 3*e* of the depressed portion 4. These processes respectively reflect the deflection stiffness of the sheet P.

From the output waveform shown in FIG. 5B, the waveforms in the region A and region B are processed by the processing circuit 22 to extract and output characteristic quantities. Examples of information preferably extracted in the processing circuit 22 include rate of gradual increase, threshold and peak voltage (maximum voltage generated), amplitude and frequency components, peak width, differentiation values, integration values, and attenuation. Of course, only the characteristic quantity in the region A, or only the characteristic quantity in the region B may be extracted. It goes without saying that only one of the characteristic quantities may be used as information.

The output waveform in the case where the sheet P is not present as shown in FIG. 5A is used as information for detecting the condition of the sheet information output apparatus 30. More specifically, it is a material for detecting individual difference and deterioration by abrasion or other causes of the sheet information output apparatus 30. Changes in the condition of the output signals from the sheet information output apparatus 30 due to fluctuation caused by disturbance such as environments (particularly, temperature and humidity), vibration or electrical noise, or errors upon incorporation into a sheet processing apparatus or a sheet information output apparatus, which will be described subsequently, may also be detected.

The signal that detects the condition of the sheet information output apparatus 30 in this manner is used as reference information upon detecting the information of the sheet P. The reference information is used in the following manner. For example, correction is conducted by taking the ratio, difference or deviation between the data value of the reference information and the data value in the case where the sheet P is held, whereby detection accuracy can be improved. When the reference information exceeds a certain range, or dispersion of values when the reference information is gained plural times exceeds a certain range, the sheet information output apparatus 30 is acknowledged as abnormal, and an alarm can be raised, or a necessary action can be automatically made. It may also be possible to control the operation of the sheet information output apparatus 30 itself (for example, to change the intensity of the external force applied, to give a bias to the output) in such a manner that the reference information comes within a certain range.

In the control portion 21 of this embodiment, the characteristic quantities may be checked with a table, in which the signals of the sheet P have been stored in advance, to output them as information obtained by checking up on the kind and size, change in conditions, printing conditions, double feed and the like of the sheet P. When the signals of the sheet P vary according to environmental conditions, conveyance conditions or the like, it is better to provide a plurality of tables corresponding to the respective signals and make checks on the basis of these tables.

In the control portion 21 of this embodiment, the values themselves of the characteristic quantities may be provided as checked information, or values obtained by subjecting the characteristic quantities to prescribed conversion may be provided as judged information. When the signals of the sheet P vary according to environmental conditions, conveyance conditions or the like, a processing for correcting the values may be conducted.

In the control portion 21 of this embodiment, the characteristic quantities or the results of checking up on the characteristic quantities may also be converted to control values corresponding to the sheet information in accordance with the prescribed calculation formulae to output them. For example, in an electrophotographic apparatus that is an example of image forming apparatus, a parameter value for controlling electric power for heating a fixer may be outputted according to the maximum voltage generated in the pressure-sensitive element 5. With respect to the sheet P, checks may be made additionally using another means (for example, input of the size of paper artificially set or signal from a sheet detection sensor separately provided). Further, in order to obtain information as to the sheet P, it is not always necessary to perform checks in the processing circuit 22, and a part thereof may be performed by a person on the basis of the signals detected in the external-force-detecting portion 2.

Examples of sheet processing apparatus, in which the sheet information output apparatus 30 of this embodiment can be installed, include image forming apparatus, image reading apparatus, information recording apparatus, information reading apparatus and sheet conveying apparatus. In a sheet processing apparatus, CPU or the like that is a microcomputer control unit controls processing of the sheet P according to the sheet information detected by the sheet information output apparatus 30. For example, adjustment of image forming conditions, adjustment of pressing force of rollers used in conveyance and conveying conditions, termination of printing, stopping of conveyance of a recording medium and generation of alarm signals may be conducted. As the CPU, any of that provided in the interior of the sheet processing apparatus and that provided in the outside may also be used. When that provided in the interior is used, however, transmission and reception of data signals to and from the outside can be omitted.

By the way, in the sheet information output apparatus 30 of this embodiment, the sheet P is deflected to the bottom face 3*e* of the depressed portion 4 by the application member 1, so that the maximum deflection quantity of the sheet P is a distance d. In addition, the depressed portion 4 is designed in such a manner that the relationship between the deflection quantity d and the groove width W, in which the sheet P is aerially supported, satisfies d=A×W2 (A: constant).

The sheet P such as a paper sheet or a resin sheet, which is the object of detection in this embodiment, mainly has a nature of an elastic body and also has such a nature of a viscoelastic body that recovery from deformation given is non-linear. In other words, when excess bending or such deformation as to cause shearing is given upon measuring deflection stiffness, the deformation is not easily recovered, and in some cases, the deformation may become irreversible, and so the sheet may be deformed or damaged. In addition, when such non-linearity appears upon measuring deflection stiffness, an error in the resulting value increases. Therefore, the sheet P is preferably deformed as an elastic body if possible, and so the relationship of [deflection quantity Y=A×(deflection length X)$^2$] is preferably satisfied in addition to the above-described relationship of [(W−s)/2>5d].

The deformation of [deflection quantity Y=A×(deflection length X)$^2$] is preferably given to the whole region in which the deflection displacement of the sheet P occurs. However, since the influence on the detection signal is actually reduced with increasing distance from the impact position of the application member 1, it is only necessary that the deflection deformation of the sheet P occurs on a part of the sheet P. Consideration may be made with exclusion of a peripheral edge portion and fixed portions of the sheet P, a portion coming into direct contact with the application member 1, portions corresponding to the edges of the depressed portion 4 and the vicinities thereof in the sheet P, which have less influence on the detection.

<Sheet Information Output Apparatus of Comparative Example>

In the sheet information output apparatus 30 of this embodiment, the depressed portion 4 is a groove formed in the receiving member 3. However, the depressed portion 4 may be replaced by a structure in which a difference in height is provided between the receiving member 3 and the lower sheet guides 10 as illustrated in FIG. 10. However, in this case, only an output waveform corresponding to the compression deformation of the sheet P is detected because no pressure is applied to the pressure-sensitive element 5 until the sheet P is caused to be bent and deformed by the application member 1, and the application member 1 impacts on the receiving member 3. In the sheet information output apparatus 30B illustrated in FIG. 10, the span of the lower sheet guide 10 is long, so that the tension of the sheet P varies, and reproducibility of the maximum output of the pressure-sensitive element 5 is not fully achieved. In addition, when the application member 1 is caused to impact with high tension applied to the sheet P, there is a possibility that the sheet P may be folded at inner edges of the lower sheet guides 10.

<Advantageous Features of the Invention>

The sheet information output apparatus 30 of this embodiment comprises an application member 1 for applying external force to a sheet P, a receiving member 3 arranged in opposition to the application member 1 for receiving the external force through the sheet P and a pressure-sensitive sensor 5 arranged in the application member 1 or the receiving member 3 for outputting a signal corresponding to the external force applied. The receiving member 3 has a depressed portion 4 at a position to which the external force is applied, the depressed portion 4 has a support portion 3*a* for aerially supporting the sheet P situated at the application position of the external force by bilaterally holding the sheet, a slope face 3*c* provided on the inner side of the support portion 3*a*, and a bottom face 3*e* receded from the support portion 3*a*. As illustrated in FIG. 2 or FIG. 11, 'W', 's' and 'd' satisfy the following relationship. Namely, assuming that the smallest length of the sheet bilaterally held by the support portions 3*a* is W, the depth from the support portion 3*a* to the bottom face 3*e* is d, and the length of the application member 1 in the direction of the smallest length in the height of the support portion 3*a* in a state that the application member 1 has been brought into contact with the bottom face 3*e* is s, said W, s and d satisfy the relationship of [(W−s)/2>5d].

Accordingly, when the application member 1 is caused to impact on the sheet P supported at the depressed portion 4 to apply external force, the sheet P is first pressed against the depressed portion 4 by the application member 1 to bend and deform the sheet P, and the application member 1 is then caused to impact on the bottom face 3*e* of the depressed portion 4 through the sheet P to compress and deform the sheet P, whereby bending resistance of the sheet P attending on the bending deformation is first detected by the pressure-sensitive element 5, and compression resistance of the sheet P attending on the compression deformation is then detected by the pressure-sensitive element 5.

Since the application member 1 compresses the sheet P at a speed decelerated by the bending resistance of the sheet P, the bending resistance of the sheet P, and in turn the elasticity and stiffness of the sheet P can be evaluated by detecting a peak height of the compression resistance.

A convenient one of the bending resistance and compression resistance is selected to conduct detection/distinguishment, whereby sheet information can be precisely detected within wider ranges of elasticity and stiffness than the case depending on only one. In other words, both bending resistance and compression resistance of the sheet P are detected or distinguished, so that one that causes larger errors is abandoned according to the circumstances, whereby sheet information can be detected precisely and correctly.

In addition, since the slope face 3*c* is provided on the depressed portion 4 receiving the application member 1 through the sheet P, and the groove width W of the depressed portion 4 is made sufficiently wide compared with the width s of the application member 1 or the depth d of the depressed portion 4, bending and frictional force of the sheet P pressed against the depressed portion 4 do not become excessive. A sufficient distance with respect to the deflection deformation quantity of the sheet P is provided between the outer diameter of the application member 1 and the inner edge 3*b* of the depressed portion 4, whereby detection can be stably conducted without suffering from unreasonable deformation by shearing at this portion of the sheet P.

Since the deformed condition of the sheet P when the application member 1 is caused to impact on the sheet P can be repeated with high reproducibility irrespective of the stiffness and coefficient of friction of the sheet P, dispersion or error of the sheet information detected becomes little, and so the detection of sheet information can be precisely conducted.

The slope face 3*c* is provided, whereby the width of the bottom face 3*e* of the receiving member 3 of the bilaterally holding span can be narrowed to enhance the stiffness of the receiving member 3, so that an output error of the pressure-sensitive element 5 attending on the deformation of the receiving member 3 can be lessened.

In the sheet information output apparatus 30 of this embodiment, the slope angle of the slope face 3*c* falls within such an angle range that the sheet P does not come into contact with the slope face when the sheet P is held between the application member 1 and the bottom face 3*e*. Accordingly, the span of the sheet P bilaterally-supported in the process of causing the sheet P to be bent and deformed is kept constant, and so bending resistance can be precisely detected by the pressure-sensitive element 5. In other words, there is no fear that the sheet P comes into contact with the slope face 3*c* in the process of causing the sheet P to be bent and deformed to shorten the span, and then the pressure-sensitive element 5 detects a great bending resistance in error.

It is also avoided that the application member 1 undergoes unnecessary deceleration by the frictional force between the slope faces 3*c* and the sheet P and the above-described excessive bending resistance to lower a peak of the waveform outputted from the pressure-sensitive element 5 attending on the compression deformation.

In the sheet information output apparatus 30 of this embodiment, the inner edge 3*b* at which the support portion 3*a* connects to the slope face 3*c*, is chamfered, so that folding attending on concentration of stress at the inner edge 3*b* and permanent deformation can be avoided upon the bending deformation of the sheet P.

In the sheet information output apparatus 30 of this embodiment, the depressed portion 4 is a parallel groove which extends through in the conveyance direction of the sheet P and is formed in the receiving member 3, so that friction with the sheet P conveyed is little compared with the depressed portion 4E illustrated in FIG. 9, the whole periphery of which rises, and so output noise of the pressure-sensitive element 5 attending on the friction can be reduced. In addition, the front and rear walls in the conveying direction of the sheet P are not present, so that it is avoided that the sheet P is pressed against the front and rear walls when the application member 1 is caused to impact to quickly increase friction. Even after the impact of the application member 1, the friction condition is stable, so that a stable output waveform can be taken out of the pressure-sensitive element 5 even when detection of sheet information is conducted while the sheet P is being conveyed. Accordingly, the influence of the friction is lessened, and precise and constant detection of sheet information becomes feasible.

In the sheet information output apparatus 30 of this embodiment, a release face 3*f* getting farther from a sheet surface toward an upstream side of the conveying direction is formed on the slope face 3*c* on the upstream side, whereby impact between the upstream side surface of the receiving member 3 and the sheet P is avoided even when the sheet P is vertically waved attending on the conveyance, or a deformed sheet is passed through, and the friction condition becomes stable. Accordingly, variation in the output of the pressure-sensitive element 5 by these impacts becomes little, and precise and constant detection of sheet information becomes feasible.

In the sheet information output apparatus 30 of this embodiment, the groove width W, the distance d and the sheet thickness t satisfy the relationship of $0<d<10t$ and the relationship of $10t<W<1000t$, so that the detection of sheet information can be executed within such a range that an ordinary sheet P can be bent and deformed by elastic deformation. Accordingly, the output of the pressure-sensitive element 5 attending on the bending deformation becomes a value corresponding to the elasticity of the sheet, and the stiffness and elasticity of the sheet can be discriminated on the basis of this output. Accordingly, precise and constant detection of sheet information becomes feasible compared with the detection of sheet information depending on only compression reaction force.

In the sheet information output apparatus 30 of this embodiment, the application member 1 is a rod material at the tip portion of which at least a curved surface in the direction of the groove width W is formed, so that the edge of the tip portion is hard to cut into the surface of the sheet P bent and deformed.

In the sheet information output apparatus 30 of this embodiment, the radius of curvature of the curved surface at the tip portion is smaller than the radius of curvature of the sheet P brought into contact with the receiving member 3 by the application member 1, so that the edge of the tip can be surely prevented from cutting into the surface of the sheet P bent and deformed.

In all the sheet information output apparatus, sheet processing apparatus, laser beam printer and image forming apparatus mentioned in the description of this embodiment, the groove width W of the depressed portion 4, the diameter of the application member 1 and the depth d of the depressed portion 4 satisfy the relationship of [(W−s)/2 >5d]. As a result, the mechanical properties of the sheet P can be well detected by controlling the deflection of the sheet P in the detection of the deflection stiffness of the sheet P.

Since the information as to the mechanical properties of the sheet P can be well outputted, it is possible to optimize the processing conditions of the sheet P according to such mechanical properties, and good sheet processed results can be obtained.

EFFECTS OF THE INVENTION

When the application member is caused to impact on a sheet supported on the depressed portion in the sheet information output apparatus according to the present invention, the application member first presses the sheet against the depressed portion to bend and deform the sheet, and the application member then impacts on the bottom face of the depressed portion through the sheet to compress and deform the sheet, whereby the bending resistance of the sheet attending on the bending deformation is first detected by the detecting means, and the compression resistance of the sheet attending on the compression deformation is then detected by the detecting means.

Since the application member compresses the sheet at a speed decelerated by the bending resistance of the sheet, the bending resistance of the sheet, and in turn the elasticity and stiffness of the sheet can be evaluated by detecting a peak height of the compression resistance.

A convenient one of the bending resistance and compression resistance is selected to conduct detection/distinguishment, whereby sheet information can be precisely detected in wider ranges of elasticity and stiffness than the case depending on only one. In other words, both bending resistance and compression resistance of the sheet are detected and distinguished, so that one having a larger error is abandoned according to the circumstances, whereby sheet information can be detected precisely and correctly.

In addition, since the slope faces are provided on the depressed portion receiving the application member through the sheet, and the smallest length of the span of the bilaterally held sheet is made sufficiently wide compared with the length of the application member in the direction of this smallest length and the depth of the depressed portion, bending and frictional force of the sheet pressed against the depressed portion do not become excessive. A sufficient distance with respect to the deflection deformation quantity is provided between the edge of the application member and the edge of the groove width W of the depressed portion, whereby detection can be stably conducted without suffering from unreasonable deformation by shearing at this portion of the sheet.

Since the deformed condition of the sheet when the application member is caused to impact on the sheet can be repeated with high reproducibility by eliminating permanent deformation by shearing friction irrespective of the stiffness and coefficient of friction of the sheet, a dispersion or error of the sheet information detected becomes little, and so the detection of sheet information can be precisely conducted. In addition, the gradient of the slope face provided inside the support portion of the depressed portion located at the application position of external force in the receiving member is designed within the specific range according to the present invention, whereby the deflected form of the sheet is stable even when the receiving member is changed with time by abrasion or the like, so that detection accuracy is not lowered.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-235178, filed Aug. 15, 2005, which is hereby incorporated by reference herein in its entirety.

What is claimed is:

1. A sheet information output apparatus comprising:

an application member for applying external force to a sheet, a receiving member arranged in opposition to the application member for receiving the external force through the sheet, and an output unit installed in the application member or the receiving member for outputting a signal according to the sheet, wherein the receiving member has a depressed portion at a position to which the external force is applied, wherein the depressed portion has a support portion for aerially supporting the sheet situated at the application position by bilaterally holding the sheet, and a bottom face receded from the support portion, and wherein when the smallest length of the sheet bilaterally held by the support portion is W, a depth from the support portion to the bottom face is d, and a length of the application member in a direction of the smallest length in the height d from the bottom face when the application member is brought into contact with the bottom face of the depressed portion is s, said W, s and d satisfy the relationship of [(W−s)/2>5d].

2. The sheet information output apparatus according to claim 1, wherein the depressed portion has a slope face provided inside the support potion, and the slope angle of the slope face falls within such an angle range that the sheet does not come into contact with the slope face when the sheet is held between the application member and the bottom face.

3. The sheet information output apparatus according to claim 1, wherein a connecting portion between the support portion and the slope face is chamfered.

4. The sheet information output apparatus according to claim 1, wherein the depressed portion is a parallel groove which extends through in the conveyance direction of the sheet and is formed in the receiving member, and the slope face connects to an inner edge of the parallel groove.

5. The sheet information output apparatus according to claim 1, wherein a release face getting farther from a sheet surface toward an upstream side of the conveying direction is formed on the slope face on the upstream side.

6. The sheet information output apparatus according to claim 1, wherein when the thickness of the sheet is t, said t, W and d satisfy the relationship of 0<d<10t and the relationship of 10t<W<100t.

7. The sheet information output apparatus according to claim 1, wherein the application member is a rod material at the tip portion of which at least a curved surface in the direction of the smallest length is formed.

8. The sheet information output apparatus according to claim 1, wherein the radius of curvature of the curved surface at the tip portion is smaller than the radius of curvature of the sheet brought into contact with the receiving member by the application member.

9. A sheet information output apparatus comprising:

an application member for applying external force to a sheet, a receiving member arranged in opposition to the application member for receiving the external force through the sheet, an output unit arranged in the application member or the receiving member for outputting a signal corresponding to the application of the external force, and a controller for distinguishing sheet information on the basis of an output from the output unit, wherein the receiving member has a depressed portion at a position to which the external force is applied, wherein the depressed portion has a support portion for aerially supporting the sheet situated at the application position by bilaterally holding the sheet, a slope face provided inside the support portion, and a bottom face receded from the support portion, and wherein when the smallest length of the sheet bilaterally held by the support portion is W, a depth from the support portion to the bottom face is d, and a length of the application member in a direction of the smallest length in a section of the height of the support portion in a condition that the application member is brought into contact with the bottom face is s, said W, s and d satisfy the relationship of [(W−s)/2>5d].

10. A sheet processing apparatus comprising:

an application member for applying external force to a sheet, a receiving member arranged in opposition to the application member for receiving the external force through the sheet, an output unit arranged in the application member or the receiving member for outputting a signal corresponding to the application of the external force, a controller for adjusting conditions as to a prescribed processing on the basis of an output from the output unit, wherein the receiving member has a depressed portion at a position to which the external force is applied, wherein the depressed portion has a support portion for aerially supporting the sheet situated at the application position by bilaterally holding the sheet, a slope face provided inside the support portion, and a bottom face receded from the support portion, and wherein when the smallest length of the sheet bilaterally held by the support portion is W, a depth from the support portion to the bottom face is d, and a length of the application member in a direction of the smallest length in a section of the height of the support portion in a condition that the application member is brought into contact with the bottom face is s, said W, s and d satisfy the relationship of [(W−s)/2>5d].

11. An image forming apparatus comprising:

an application member for applying external force to a sheet, a receiving member arranged in opposition to the application member for receiving the external force through the sheet, an output unit arranged in the application member or the receiving member for outputting a signal corresponding to the application of the external force, a controller adjusting conditions as to image formation on the basis of an output from the output unit, wherein the receiving member has a depressed portion at a position to which the external force is applied, wherein the depressed portion has a support portion for aerially supporting the sheet situated at the application position by bilaterally holding the sheet, a slope face provided inside the support portion, and a bottom face receded from the support portion, and wherein when the smallest length of the sheet bilaterally held by the support portion is W, a depth from the support portion to the bottom face is d, and a length of the application member in a direction of the smallest length in a section of the height of the support portion in a condition that the application member is brought into contact with the bottom face is s, said W, s and d satisfy the relationship of [(W−s)/2>5d].

12. A sheet information output apparatus comprising:

an application member for applying external force to a sheet, a receiving member arranged in opposition to the application member for receiving the external force through the sheet, and an output unit arranged in the application member or the receiving member for outputting a signal corresponding to the application of the external force, wherein the receiving member has a depressed portion at a position to which the external force is applied, wherein the depressed portion has a support portion for aerially supporting the sheet situated at the application position by bilaterally holding the sheet, a slope face provided inside the support portion, and a bottom face receded from the support portion, and wherein when a face linking a first supporting face and a second supporting face, at which the sheet is bilaterally held by the support portion, is regarded as a reference face, the slope face has a gradient of from 5% to 20% to the reference face.

* * * * *

UNITED STATES PATENT AND TRADEMARK OFFICE

CERTIFICATE OF CORRECTION

PATENT NO. : 7,380,451 B2
APPLICATION NO. : 11/463966
DATED : June 3, 2008
INVENTOR(S) : Kawasaki et al.

It is certified that error appears in the above-identified patent and that said Letters Patent is hereby corrected as shown below:

COLUMN 1:
Line 22, "been" should be deleted.

COLUMN 2:
Line 5, "scratch" should read --scratches--.
Line 9, "little, little" should read --little, and little--.
Line 40, "which" should read --whose--.

COLUMN 7:
Line 28, "is" should read --was--.
Line 62, "sheet P" should read --sheet P.--.

COLUMN 10:
Line 48, "sheet P" should read --sheet P.--.

COLUMN 11:
Line 21, "one tenth" should read --one-tenth--.

COLUMN 12:
Line 27, "may" should read --it may--.
Line 40, "more-" should read --more--.
Line 52, "may" should read --it may--.

COLUMN 14:
Line 30, "transmits" should read --transmit--.

Signed and Sealed this

Twenty-fifth Day of November, 2008

JON W. DUDAS
*Director of the United States Patent and Trademark Office*